United States Patent [19]
Stedt

[11] 3,876,095
[45] Apr. 8, 1975

[54] MATERIAL HANDLING APPARATUS

[76] Inventor: Harry C. Stedt, 375 Worcester Rd., Wellesley, Mass. 02181

[22] Filed: Mar. 5, 1973

[21] Appl. No.: 338,323

[52] U.S. Cl. ............ 214/501; 214/77 R; 214/147 G; 296/28 CV
[51] Int. Cl. .............................................. B60p 1/04
[58] Field of Search ................. 180/77 S, 77 C, 89; 296/28 M, 28 CV; 214/147 G, 501, 130 R, 77 R; 212/42

[56] References Cited
UNITED STATES PATENTS

| | | | |
|---|---|---|---|
| 3,003,810 | 10/1961 | Kloote | 296/28 M |
| 3,384,253 | 5/1968 | Wood | 214/501 |
| 3,448,820 | 6/1969 | Aiello | 180/77 S |
| 3,451,571 | 6/1969 | Brisson | 180/77 S |

FOREIGN PATENTS OR APPLICATIONS
213,710  2/1961  Austria............................ 180/77 C

*Primary Examiner*—Albert J. Makay
*Attorney, Agent, or Firm*—John E. Toupal

[57] ABSTRACT

Disclosed is a material handling apparatus with a cab and a body mounted on a truck frame. An articulating crane is mounted on the frame between the cab and the body and is responsive to controls within the cab. As the operator sits at the controls in the cab, visibility of the crane operation is provided by a rear window in the cab and a cut out corner portion of the body. An auxiliary seat and set of controls is provided so that the operator can control the crane from either side of the cab. A second cut out corner portion improves visibility from the auxiliary seat.

26 Claims, 4 Drawing Figures

MATERIAL HANDLING APPARATUS

BACKGROUND OF THE INVENTION

This invention relates to cranes and, more particularly, to truck mounted articulating cranes.

Certain material handling operations, such as those involved in the cleaning of catch basins and the transportation of the debris removed therefrom, become difficult in restricted spaces. In order to provide relatively compact equipment, catch basin cleaners have been fabricated by mounting a crane on a truck. However, problems have been evident with such prior catch basin cleaning equipment. For example, in some cleaners the extension of the cable retaining the bucket required manipulation of a telescopic mast. This requirement of changing mast height made operation difficult in vertically restricted areas such as under bridges or utility lines. In addition, the crane controls were placed outside of the cab to insure that the operator had good visibility when operating the crane. Therefore the operator was forced to leave the cab to manipulate the equipment and was subjected to a considerable degree of discomfort during inclement weather.

The object of this invention, therefore, is to provide a material handling apparatus suitable for cleaning catch basins and the like in restricted areas, such as city streets, while maintaining the equipment operator in more comfortable surroundings than provided by conventional equipment.

SUMMARY OF THE INVENTION

This invention is characterized by a material handling apparatus including a cab with a rear window mounted on a truck frame and a relatively large body mounted on the frame to the rear of the cab. The body defines a cut front corner portion for reducing obstruction of the operator's vision as he views rearwardly from the cab. A large body is used to maximize the payload capacity of the apparatus. A crane apparatus is mounted on the frame with a mast extending substantially vertically between the cab and the body. The upper end of the mast is affixed by a coupling system including a pivot to a boom that can assume various positions, including positions with an outer end of the boom higher and lower than the pivot. The crane further comprises a jib coupled to the outer end of the boom by an articulating joint and a telescopic jib extension on the jib. Controls for the crane are in the cab. A bucket is coupled to the jib extension by a cable and various buckets disclosed include hydraulic double acting orange peel and clam shell configurations that are suitable for cleaning catch basins. Cleaning catch basins is substantially simplified by the utilization of the subject apparatus. This is particularly so in restricted areas such as city streets. The apparatus is parked as near as possible to the basin to be cleaned and the articulated crane permits the outer end of the jib extension to be disposed close to the opening of the catch basin. Thus, greater depth can be reached by the bucket with a given length of cable than is possible with a non-articulated crane. Furthermore, the operator can view the operation from within the cab through the rear window inasmuch as the cut out corner section prevents obstruction of his vision. Consequently, the entire cleaning operation is performed by manipulating controls within the cab and thus the operator remains comfortable and at his peak efficiency even when cleaning catch basins in inclement weather. When the cleaning job is completed, the telescopic jib extension is withdrawn and the crane is moved to a storage position thus providing a compact apparatus that is easily moved from basin to basin even in highly populated areas.

A feature of the invention is the utilization of a dump truck frame in conjunction with the mounting of the crane on a pivotal mounting system. Furthermore, a motive system is provided for pivoting the crane in response to manipulation of the controls within the cab. The crane can be pivoted to a position in which the boom is disposed over the cab to permit the truck body to dump in the conventional manner. Thus, the debris cleaned from the catch basins can easily be emptied. Furthermore, the articulating crane folds compactly enough that it can be left in this position adn the truck used as a conventional dump truck when the crane is not needed.

Another feature of this invention is the incorporation of a hydraulically controlled winch mounted on the jib to release and retract the cable that attaches the bucket to the jib extension. The winch permits vertical motion of the bucket without corresponding vertical motion of the boom. Therefore, operation in vertically restricted areas, such as under bridges or telephone wires, is more convenient.

Still another feature of the invention is the inclusion of a swivel seat in the cab that locks in forward and backward positions. The operator of the vehicle uses the seat locked in the conventional forward position to drive the apparatus from place to place. Upon reaching a catch basin to be cleaned, the seat is released and swivelled to the rearwardly facing position and locked therein. In this position the operator is facing the rear window and has, due to the cut corner section, good visibility of the catch basin area.

Still another feature of the invention is the inclusion of an auxiliary swivel seat and an auxiliary control system in conjunction with another cut out corner section. The operator can park the vehicle with the catch basin to be cleaned on either side thereof and sit in the appropriate seat and utilize the associated set of controls. Thus, the cleaning operation is further simplified.

DESCRIPTION OF THE DRAWINGS

These and other features and objects of the present invention will become more apparent upon a perusal of the following description taken in conjunction with the accompanying drawings wherein.

DESCRIPTION OF THE PREFERRED EMBODIMENTS

Figure 1:
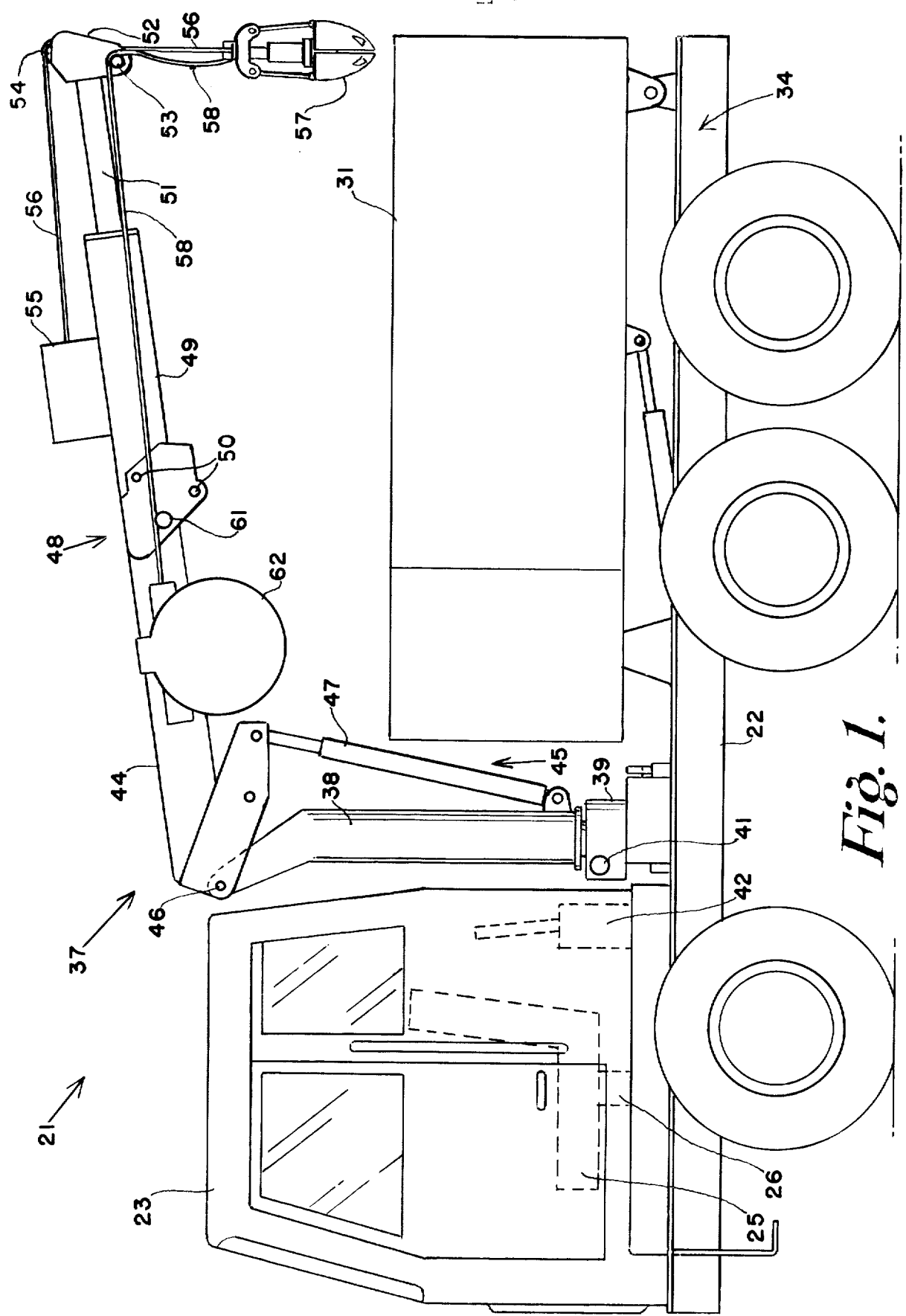
FIG. 1 is an elevation view of a preferred material moving apparatus.
Figure 2:
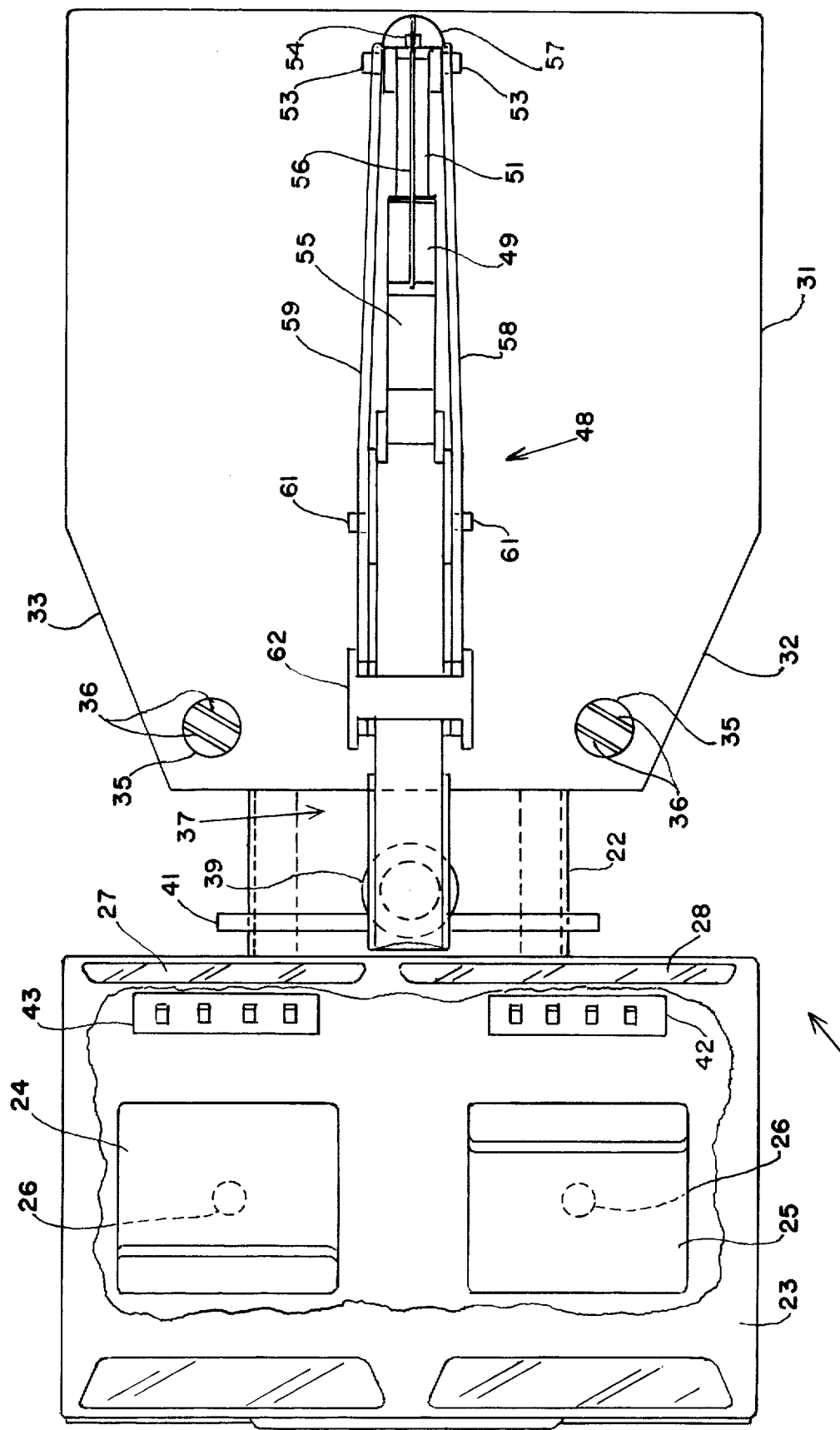
FIG. 2 is a plan view of the apparatus shown in FIG. 1.

Referring first to FIGS. 1 and 2 there is shown a preferred material handling apparatus 21 including a truck frame 22 with a cab 23 mounted thereon. As shown in phantom in FIG. 1 and in the cut out section of FIG. 2, the cab 23 encloses two seats 24 and 25 that are mounted on swivel bases 26. The rear of the cab 23 includes two rear windows 27 and 28. To the rear of the cab 23 is a body 31 including a cut out front corner section 32 and an auxiliary cut out front section 33. Observation of FIG. 2 will show that the front cut out sections 32 and 33 help reduce obstruction of the operator's vision when he looks through the rear windows 27 and 28. The use of a large body 31 with cut out corners provides good visibility with a large payload capacit. The body 31 is mounted on the frame 22 by conventional dumping apparatus 34 so that the load in the body 31 can be dumped. Furthermore, the bottom of the body portion defines water outlets 35 with strainer bars 36 thereacross for permitting liquid contents of the body to drain.

Mounted between the cab 23 and the body 31 is an articulating crane 37. A mast 38 is mounted on the frame 22 by a pivotal mounting system 39. a double acting motive hydraulic cylinder 41 operates in conjunction with a rack and pinion system within the mount 39 to pivot the mast on the body 22. The cylinder 41 is responsive to a set of controls 42 and to an auxiliary set of controls 43 both within the body 23. A boom portion of the crane 37 is shown extending horizontally from the mast 38 in FIG. 1 and includes a boom 44 affixed to the mast by a coupling system 45 including a pivot 46. The pivot 46 permits the outer end of the boom 44 to assume positions above and below horizontal alignment with the pivot 46. A hydraulic cylinder 47 within the coupling system 45 is also responsive to the controls 42 and 43 and sets the angular position of the boom with respect to a horizontal plane.

An articualted joint 48 having pivot connection 50 couples a jib 49 to the boom 44. Emerging from the end of the jib 49 is a telescopic jib extension 51. A hydraulic cylinder (not shown in order to preserve clarity) controls the disposition of the articulated joint 48 and a hydraulic cylinder within the jib and jib extension controls the extension of the telescopic jib extender 51. Both hydraulic cylinders are responsive to the controls 42 and 43. Mounted on the telescopic jib extender 51, at the outer end of the boom system, is a termination apparatus 52 that supports two outer hose pulleys 53 and a cable pulley 54. Suspended from the termination apparatus 52 by a cable 56 is an orange peel bucket 57. The bucket is hydraulically operated and is responsive to the controls 42 and 43. Two hydraulic hoses 58 and 59 are coupled to the bucket 57 and supported by the hose pulleys 53 and supplemental hose pulleys 61 at the articulated joint 48. The length of the two hoses 58 and 59 is governed by a hose reel 62 mounted on the boom 44. The bucket will be described in more detail below. The other end of the cable 56 is coupled to a hydraulic winch 55 that also is responsive to the controls 42 and 43. The winch 55 permits vertical motion of the bucket 57 without corresponding motion of the boom 44 therefore facilitating operation under bridges.

Figure 3:
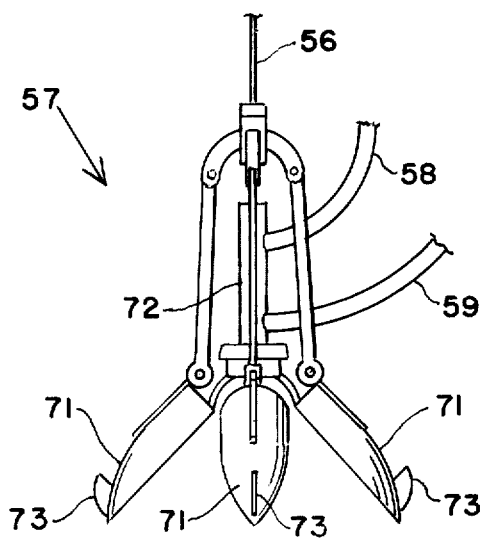
FIG. 3 shows an orange peel bucket that can be used in conjunction with the apparatus shown in FIGS. 1 and 2.

Referring to FIG. 3 there is shown a more detailed view of the orange peel bucket 57. Four digging portions 71 are responsive to a double acting hydraulic cylinder 72. The double acting cylinder 72 permits the bucket 57 to both open and close under power. Each digging section 71 supports a rooter 73 for forcibly displacing roots and other debris when the bucket 57 is opened under pressure. The hydraulic cylinder 72 is, of course, responsive to the controls 42 and 43. This type of orange peel bucket 57 is more fully described in my U.S. Pat. No. 2,877,575.

During operation, the operator sits in the seat 25 with the seat locked in the forward position as shown in FIGS. 1 and 2. The apparatus 21 is driven like a conventional truck to the location of the catch basin to be cleaned. While the apparatus 21 is being driven, the crane 37 is kept withdrawn in a position such as is shown in FIGS. 1 and 2 so that the apparatus can pass under bridges and through spaces only slightly larger than required for a conventional truck of comparable body size. Upon arrival at the location of the catch basin the apparatus 21 is parked. If the catch basin to be cleaned is on the left (driiver's side) of the truck, the operator swivels the seat 25 to a rearwardly facing position. The seat 25 is then locked in the rearwardly facing position. In that position, the operator can see a catch basin that is close to the apparatus 21 due to the cut out corner 32. Since all of the crane functions can be controlled by the controls 42, the operator never need leave the cab 23. Thus he will remain comfortable even during inclement weather. To provide best control over the bucket 57, the operator will manipulate the articulated crane 37 so that the outer end of the telescopic jib extender 51 is disposed near the opening of the basin to be cleaned. The operator will then remove the cover of the catch basin by a conventional method. Since the operator has a clear view, he can place the apparatus 52 directly over the opening of the basin. Furthermore, since the articulating crane permits operation with only a short cable 56, there is little likelihood of the heavy bucket 57 dangerously swinging. The bucket 57 is utilized to clean the basin, dumping each bucket load in the body 31. It will be appreciated that the apparatus 21 can conveniently be used under low bridges, tree branches or hanging electric wires inasmuch as the winch 55 permits the bucket 57 to be raised and lowered without corresponding vertical boom motion.

Obviously, if the catch basin to be cleaned were on the right side of the truck, the operator would move to the seat 24 and view the basin through the window 27 while manipulating the controls 43. When the body 31 of the truck is full of debris collected from catch basins, the truck apparatus 21 is then driven to the debris dumping station. Upon arrival at the dumping station, the crane 37 is manipulated so that the boom apparatus does not interfere with the conventional dumping operation of the body 31. The body 31 is dumped and, following the dumping operation, the apparatus is ready for further catch basin cleaning operations. Furthermore, the articulated crane 37 can be rotated to a position in which the boom apparatus points forward. In that configuration, the outer end of the retracted jib extender 51 is only slightly in front of the cab 23. The crane apparatus 37 can be left in that position semipermanently and the apparatus used as a conventional dump truck.

Figure 4:
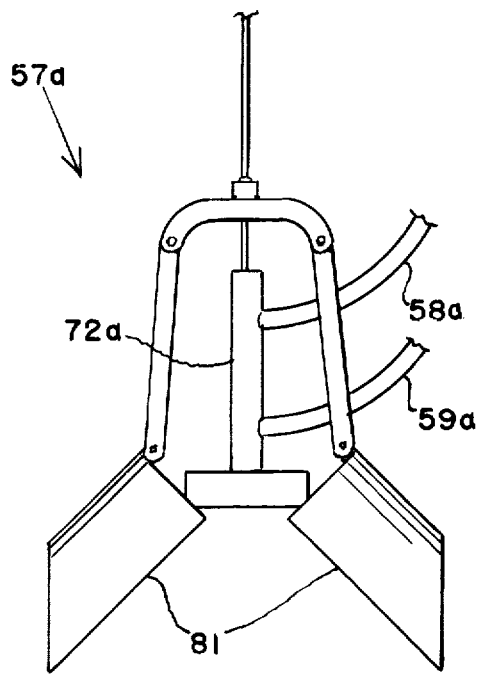
FIG. 4 shows a clam shell bucket that can be used in place of the orange peel bucket shown in FIG. 3.

Referring now to FIG. 4, there is shown an alternate bucket 57a that is a clam shell bucket. A double acting cylinder 72a is also responsive to the controls 42 and 43. However, only two clam shell scoop portions 81 are used. The choice between the two buckets 57 and 57a rests with the user. The apparatus 21 functions equally well with either.

Obviously, many modifications and variations of the present invention are possible in light of the above teachings. For example, each of the seats could be included in a separate cab, or three cabs could be employed; one for use when driving the vehicle from place to place and one for each set of crane controls. It is to be understood, therefore, that the invention can be practiced otherwise than as specifically described.

What is claimed is:

1. Material handling apparatus comprising:
   a unitary truck frame;
   cab means mounted on said frame and defining an operator station for accommodating an operator of said apparatus, said cab means having rear window means for permitting viewing out of the rear of said cab means;
   truck control means disposed in the forward portion of said cab;
   crane means comprising mast means mounted on said frame, boom means attached to said mast means by coupling means, and bucket means coupled to said boom means at an outer end thereof, said outer end being spaced apart from said coupling means and said coupling means comprising pivot means for permitting motion between said boom means and said mast means such that said outer end can be moved to various positions, including positions higher and lower than said pivot means;
   crane control means within said cab means for controlling said crane means and located to the rear of said operator station and intended to be normally operable by an operator positioned in said operator station and facing rearwardly and looking out of said rear window means; and
   a relatively large body portion mounted on said frame to the rear of said cab means, said body portion comprising a cut front corner section for reducing obstruction of the operator's vision when occupying said operator station and viewing through said rear window means and operating said crane control means.

2. Apparatus according to claim 1 comprising dump means for dumping the contents of said body.

3. Apparatus according to claim 1 comprising mounting means for pivotally mounting said crane means on said frame between said cab means and said body.

4. Apparatus according to claim 3 wherein said mounting means comprises motive means operatively coupled to said control means for rotating said crane means in response to manipulation of said control means.

5. Apparatus according to claim 4 wherein said bomm means comprises a boom coupled to said coupling means and a jib means coupled to said boom by an articulating joint responsive to said control means.

6. Apparatus according to claim 5 wherein said jib means comprises a telescopic jib extension responsive to said control means and said jib extension comprises said outer end.

7. Apparatus according to claim 5 wherein said bucket means is coupled to said outer end by a cable and said crane means comprises winch means responsive to said control means for providing bucket motion without corresponding motion of said boom means.

8. Apparatus according to claim 7 wherein said winch means is mounted on said jib means.

9. Apparatus according to claim 8 wherein said bucket means comprises a clam shell bucket for cleaning catch basins.

10. Apparatus according to claim 8 wherein said bucket means comprises an orange peel bucket for cleaning catch basins.

11. Apparatus according to claim 8 wherein said bucket means is hydraulic and responsive to said control means and said crane means comprises hose reel means for coiling and extending an hydraulic hose coupled to said bucket means as said bucket means moves with respect to said jib means.

12. Apparatus according to claim 11 wherein said bucket means comprises a double acting bucket.

13. Apparatus according to claim 12 wherein the bottom of said body defines water passages.

14. Apparatus according to claim 1 wherein said crane means comprises an articulating crane.

15. Apparatus according to claim 1 wherein said coupling means comprises an hydraulic cylinder.

16. Apparatus according to claim 1 wherein said cab means comprises a swivel seat for facing forward when the operator is driving said apparatus and facing rearwardly when the operator is manipulating said control means.

17. Apparatus according to claim 1 wherein said control means is disposed on one side of said frame within said cab means and said apparatus comprises auxiliary control means disposed within said cab means on the side of said frame opposite said one side and said body portion comprises a second cut front corner section.

18. Material moving apparatus comprising:
    a unitary truck frame;
    cab means mounted on said frame and defining an operator station for accommodating an operator of said apparatus, said cab means having rear window means for permitting viewing out of the rear of said cab means;
    truck control means disposeod in the forward portion of said cab;
    crane means mounted on said frame and comprising bucket means for moving material and winch means for controlling the position of said bucket means;
    control means operatively coupled to said winch means and disposed within said cab means and located to the rear of said operator station and intended to be normally operable by an operator positioned in said operator station and facing rearwardly and looking out of said rear window means; and
    a relatively large body portion mounted on said frame to the rear of said cab means, said body portion comprising a cut front corner section for reducing obstruction of the operator's vision when occupying said operator station and viewing through said rear window means and operating said crane control means.

19. Apparatus according to claim 18 comprising dump means for dumping the contents of said body.

20. Apparatus according to claim 18 comprising mounting means for pivotally mounting said crane means on said frame between said cab means and said body.

21. Apparatus according to claim 20 wherein said mounting means comprises motive means operatively coupled to said control means for rotating said crane means in response to manipulation of said control means.

22. Apparatus according to claim 18 wherein said crane means comprises an articulating crane.

23. Apparatus according to claim 18 wherein said cab means comprises a swivel seat for facing forward when the operator is driving said apparatus and facing rearwardly when the operator is manipulating said control means.

24. Apparatus according to claim 18 wherein said control means is disposed in said cab means on one side of said frame and said apparatus comprises auxiliary control means disposed in said cab means on the side of said frame opposite said one side and said body portion comprises a second cut front corner section.

25. Apparatus according to claim 18 wherein said bucket means comprises a clam shell bucket for cleaning catch basins.

26. Apparatus according to claim 18 wherein said bucket means comprises an orange peel bucket for cleaning catch basins.

* * * * *